United States Patent
Henaff et al.

(10) Patent No.: US 7,353,283 B2
(45) Date of Patent: Apr. 1, 2008

(54) METHOD FOR CONTROLLING ACCESS TO INTERNET SITES

(75) Inventors: Mari-Mai Henaff, Rospez (FR); Laurent Aubertin, Louannec (FR)

(73) Assignee: France Telecom, Paris (FR)

( * ) Notice: Subject to any disclaimer, the term of this patent is extended or adjusted under 35 U.S.C. 154(b) by 551 days.

(21) Appl. No.: 10/399,618

(22) PCT Filed: Oct. 18, 2001

(86) PCT No.: PCT/FR01/03223

§ 371 (c)(1),
(2), (4) Date: Sep. 5, 2003

(87) PCT Pub. No.: WO02/33933

PCT Pub. Date: Apr. 25, 2002

(65) Prior Publication Data

US 2004/0049587 A1   Mar. 11, 2004

(30) Foreign Application Priority Data

Oct. 19, 2000   (FR) .................................. 00 13410

(51) Int. Cl.
*G06F 15/16* (2006.01)
(52) U.S. Cl. ...................... 709/229; 709/217; 709/218; 709/219; 709/220; 709/225
(58) Field of Classification Search ........ 709/217–220, 709/225, 229

See application file for complete search history.

(56) References Cited

U.S. PATENT DOCUMENTS

| 5,708,780 | A | | 1/1998 | Levergood et al. |
| 5,748,890 | A | * | 5/1998 | Goldberg et al. ............... 726/2 |
| 5,812,776 | A | | 9/1998 | Gifford |
| 5,875,296 | A | * | 2/1999 | Shi et al. ........................ 726/5 |
| 6,098,056 | A | * | 8/2000 | Rusnak et al. ................. 705/75 |
| 6,205,480 | B1 | * | 3/2001 | Broadhurst et al. ......... 709/225 |
| 6,418,420 | B1 | * | 7/2002 | DiGiorgio et al. ............ 705/40 |
| 6,609,658 | B1 | * | 8/2003 | Sehr ............................ 235/384 |
| 6,636,894 | B1 | * | 10/2003 | Short et al. ................. 709/225 |
| 6,657,538 | B1 | * | 12/2003 | Ritter ........................ 340/5.81 |
| 2001/0039587 | A1 | * | 11/2001 | Uhler et al. ................. 709/229 |
| 2002/0059402 | A1 | * | 5/2002 | Belanger .................... 709/220 |

FOREIGN PATENT DOCUMENTS

| EP | 0992873 A | 4/2000 |
| WO | WO 9642041 A | 12/1996 |

OTHER PUBLICATIONS

International Search Report from corresponding PCT application No. PCT/FR01/03223, filed Oct. 18, 2001.

* cited by examiner

*Primary Examiner*—Liang-che Wang
(74) *Attorney, Agent, or Firm*—Wolf, Greenfield & Sacks, P.C.

(57) ABSTRACT

The invention concerns a method for controlling access to an Internet site from said site address. The inventive method consists in: registering said sites in a hosting service; recording data identifying users of the hosting service and data concerning each of said users including access rights to one or several hosted sites; verifying for every request for access to a hosted site address whether said request originates from a registered user and whether said user has access rights for said address.

15 Claims, 1 Drawing Sheet

METHOD FOR CONTROLLING ACCESS TO INTERNET SITES

This invention relates to a method for controlling website access. It also relates to a device for controlling access to given website addresses, usually provided by sending an electronic message (e-mail).

A website address is normally designated by the acronym URL. This acronym will be used hereafter throughout the specification.

On-line site design has become relatively easy. The number of personal pages, therefore of URLs, is increasing steadily. In general, the information displayed on the sites is accessible without restriction.

However, in order to meet new demands, the web designer wishes to restrict access to all or part of the site to a list of identified persons.

This task is all the more difficult as transmitting addresses, i.e. URLs, via e-mail is common practice. Indeed, when reading such a message, one click on the URL activates a browser which will directly connect to the corresponding site. It is understandable that the possibility of transferring a message comprising a URL is making control of the addressees, who will be aware of the URL, even more difficult.

One means known so far, though insufficient in case of transfer, for limiting access to a site is to protect it by means of a connection identifier (hereafter called login) and password, and to distribute such information to authorized persons only. However, nothing can stop these persons from transmitting this information to other persons without informing the message sender thereof.

The problem encountered is therefore to enable the on-line site designer to control access to said site so as to allow access thereto to authorized users only.

In correlation with this problem, another problem is to be able to transmit the site URL in an electronic message while making sure that only the original and therefore authorized addressees can access it.

Thus, it will be possible to refuse access to the site to secondary addressees of the message (those to whom the message has been transferred at a later time).

It is also desirable to avoid complicated login and password management for the sender.

In order to solve these problems, the invention offers a method for controlling access to one or several websites, mainly characterized in that it comprises the steps of:
  registering said sites with a hosting service,
  storing information identifying the users of the hosting service and information for each of said users including access rights to one or several hosted sites,
  checking for all requests for accessing an address of a hosted site whether this request comes from a registered user and whether this user has rights for accessing this address.

According to another feature, a request for accessing an address of a hosted site can result from said address being selected inside an electronic message.

According to the method, it will be possible to update user records and information on the rights they have been granted.

Information on the rights granted include the address(es) of the sites that can be accessed.

In addition to the address(es), information on the rights granted can include data representing a validity period of the right granted.

The invention also relates to a device for controlling access to website addresses, mainly characterized in that it comprises:
  hosting means for registering said sites and providing a hosting service,
  means for storing information identifying users of the hosting service and information for each of said users including access rights to one or more hosted sites,
  means for checking for all requests for accessing an address of the hosted site whether this request comes from a registered user and whether this user has rights for accessing this address.

According to another feature of the device, the hosting means is embodied by a server being the hosting service.

According to another feature of the device, the means for storing identification information is embodied by a server being a user database.

According to another feature of the device, the means for checking access requests is embodied by a server.

According to one embodiment, the servers are separate servers physically and logically linked together.

The invention also relates to a server hosting websites, mainly characterized in that it comprises means for linking to a server being a user database, one or more users being full members of the hosted sites, and means for linking to a server comprising a unit for managing site addresses and rights for accessing these addresses for each user of the database.

The invention also relates to an administration server, mainly characterized in that it comprises a unit for managing website addresses and information on rights for accessing these addresses for users, and means for linking to a server on which information identifying said users is stored, this server being a user database.

And finally, the invention relates to a user database server, mainly characterized in that it comprises means for storing information identifying the users of a website hosting service, means for linking to a server providing said hosting service, and means for linking to a server including a unit for managing the addresses of hosted websites and information on rights for accessing these addresses for the users.

Other features and advantages of the invention will appear clearly from reading the description which is made hereafter and with reference to the drawings.

Figure 1:
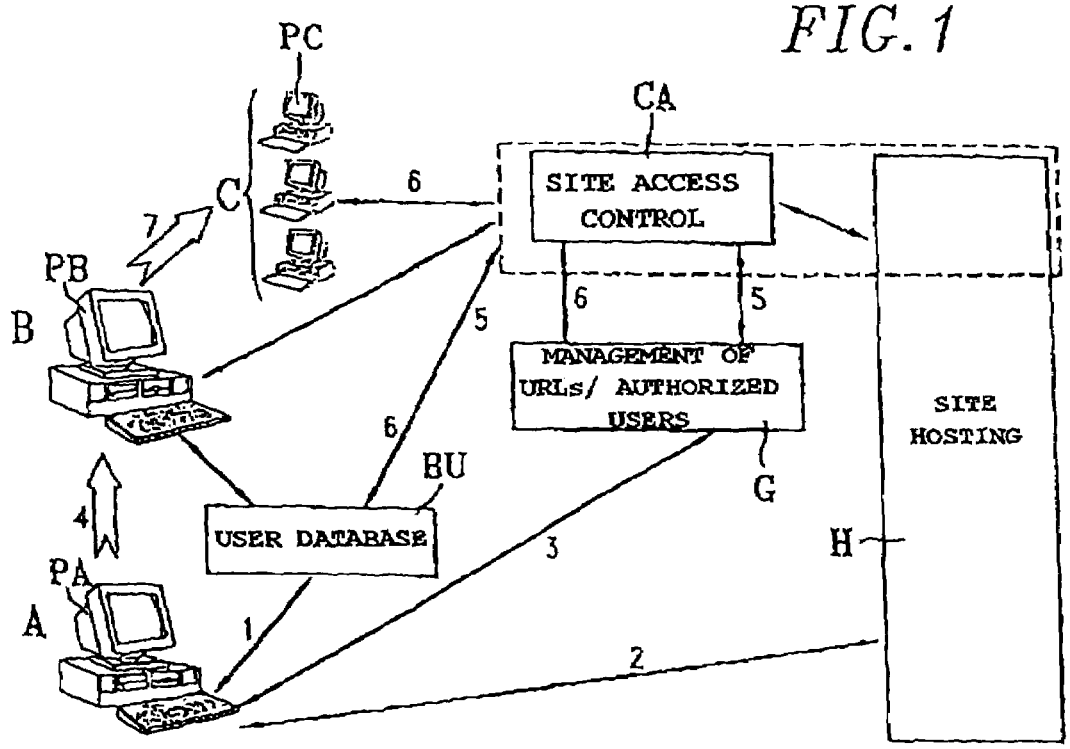
FIG. 1 represents the architecture of a website access system comprising a control device according to the invention.

The control device illustrated in FIG. 1 comprises:
  A user database BU managing user registration and validating their authentication for access to the hosting service.
  A hosting service H for personal sites linked to the user database BU, including one or more hosting servers;
  A unit G managing for each address (URL) of hosted sites information regarding rights of access to these addresses for the users registered in the database. This information can simply be a list of authorized users composed of data identifying each user associated with the addresses accessible for each of them.

These elements are functionally related, i.e. physically or logically linked. However, they are not necessarily grouped on the same functional unit.

Indeed, the user database BU can be composed of a first database server, the hosting service H can be embodied by a second server, whereas the unit G managing for each address of the hosted sites information regarding the rights of access to these addresses can be a third server.

The control device further comprises a control unit CA known in itself and which is in practice embodied by some code placed at the beginning of the code of a site and triggers when this site is called up. The function carried out by this unit CA (this code) is the authentication of a user wishing to access the site involved, by checking the login of the user wishing to view the site as well as his password.

In the general architecture of a system giving access to a site such as the one represented in this figure, there will of course be user terminals PA, PB, PC (microcomputers or stations) equipped with computing tools capable of accessing websites, i.e. in particular, equipped with a browser.

In this architecture, it is also possible to have units for sending electronic messages, not shown in this figure, and a web messaging service linked to the user database BU.

The control method according to the invention comprised the following steps:

First, registering the sites with the hosting service by each user wishing to take advantage of this service, storing information identifying the users of the hosting service and information for each of said users including rights of access to one or more of the hosted sites, checking for each request for accessing an address of a hosted site whether this request comes from a registered user and whether this user has rights for accessing this address.

For a better understanding, herebelow, the control system, the logical links of which are illustrated by the numbers 1 to 7 in the figure, will be explained in further detail:

In order to take advantage of the access control, prior registration of the users in the user database is required.

1 A user A must therefore register with the user database.

2 This user A can then create a personal site on the hosting server (several servers can of course be provided).

3 User A registers with the user database of the hosting service and chooses one or more users B also registered in the user database BU. By use of unit G for managing URLs/authorized users he specifies which users will have access to which URLs at this unit.

4 User A provides the URLs of his sites to the persons B of his choosing by any means (voice, fax, mail, etc.).

5 Upon receipt of this information (rights for accessing the various URL addresses authorized by A), user B can connect to the URLs provided.

6 Via the site access control unit, the hosting service prompts B to authenticate (B must enter his login and password in the session opened with the hosting server). When the hosting service has checked the validity of the authentication in the user database BU and of the right granted by A with the unit for managing URLs/authorized users, B can access the contents of the requested URL.

7 In the following, the case will be envisaged where the user B passes the URL provided by A on to users C registered or not in the user database BU.

8 If one of the users C connects to the provided URL, the hosting service, by means of the site access control unit, prompts C to authenticate (input of login and password). If C is not registered in the user database or if he has registered but does not have access rights registered in the unit for managing URLs/authorized users, he cannot access the contents of the URL.

According to the method, it is possible at any time for a user of the hosting service to modify the information regarding the access rights he has granted for his site in the site access control unit.

Even if a user B has already viewed a URL, it is possible to modify his access rights and refuse further viewing.

One improvement of the proposed system is to extend access control by adding to the access right information therein data representing the time validity of the rights granted. It is also possible, for instance, to refuse access after 10 days or to authorize it only between 8 am and 7 pm.

Figure 2:
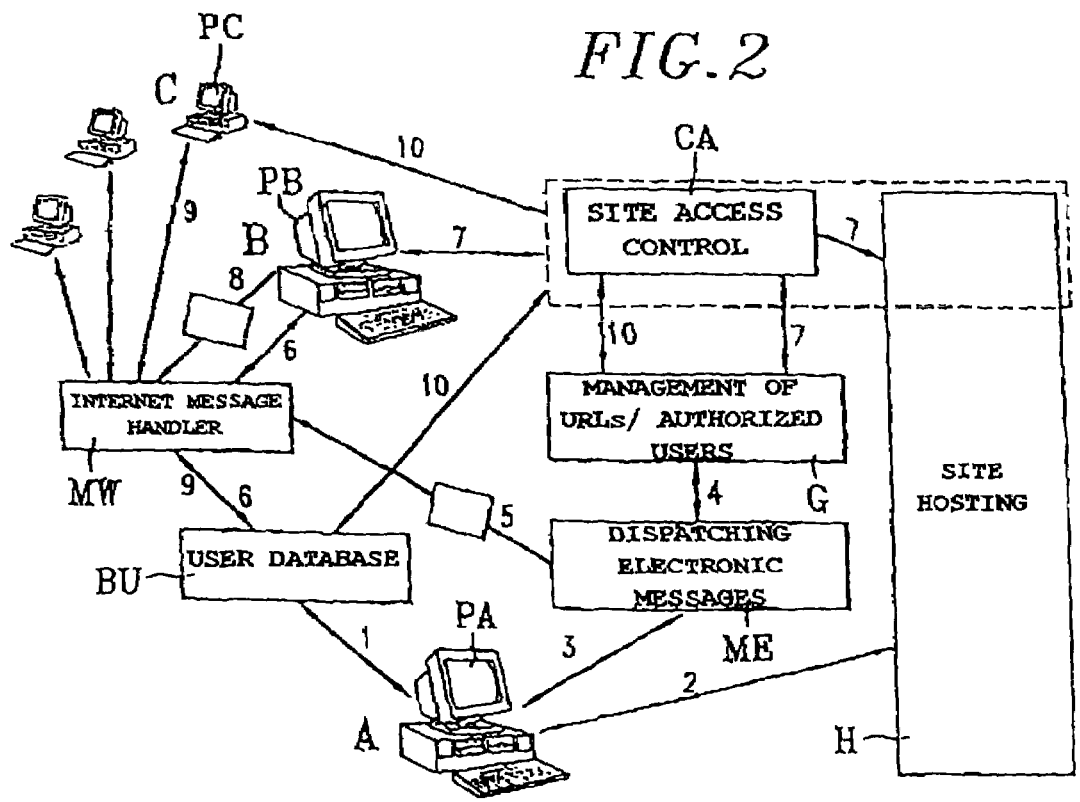
FIG. 2 represents the architecture of such a system when URLs are transmitted via electronic messaging.

Now, by way of example, the operation with URLs being transmitted via electronic mail (e-mail) illustrated in FIG. 2 will be described.

This operating mode is of course based on the system described previously. The URL is transmitted within an electronic message dispatched from a message sending unit ME, conventional in itself, linked to units for site hosting H and managing URLs/authorized users.

For simplicity's sake, the case where the electronic address of the addressee is managed by a message handler MW using the same user database BU as the other units G, H, CA will be examined. Thus, many operations are performed by these units and the users benefit from more convenient browsing. Control is performed in a more transparent way for the users.

1 User A registers with the user database BU.

2 He sets up a personal site at the hosting service.

3 He sets up an electronic message and includes therein the URL of the created site.

He chooses one or more addressees B also registered in the user database. If the addressees are not registered, they will actually receive the message and the URL but will not be able to access it.

4 Before the message is dispatched, URL/authorized user matches are stored in the corresponding unit.

5 The message is sent to the address of the addressee B who is managed by the internet message handler.

6 The user B connects to the internet message handler and authenticates (input of login and password pair or the like). The internet message handler checks the validity of the authenticator and if applicable allows viewing of the message received.

The authentication system is conventionally based on using cookies containing information on the validity of the authentication. The format used and the systems are shared by the internet message handler and the site access control.

7 User B clicks on the URL of the message. Via the site access control unit, the hosting service checks the rights of B by consulting the unit for managing URLs/authorized users, B is authenticated due to the information existing in the cookie submitted by the internet message handler. B can access the contents of the URL.

8 B transfers the message from A to users C registered or not in the user database 9 C views the message at the internet message handler after authentication (8).

C clicks on the URL of the message. The information contained in an indicator (information regarding the user and which is more commonly called a cookie) enables the site access control unit to identify him. C is not part of the authorized users. Access to the site is refused.

11 Advantageously, even if the electronic address of the addressees is not part of those managed by the internet message handler, the system described is still valid. Indeed, in this case, the side access control unit does not use cookies for authenticating the user, but prompts him to input his login and password. It checks the validity by querying the user database BU.

The invention claimed is:

1. A method for controlling access to a plurality of web sites, the method comprising the steps of:
   registering a plurality of users with a hosting service by storing information identifying each of said users;
   registering a plurality of controlled access web sites with the hosting service;
   for each of said registered users, storing information including rights of access of said registered users to one or more of said registered sites in a site access control unit;
   performing an update of the registered users and of the information on the rights granted to said registered users, wherein the information on the granted rights includes data representing a validity period of the granted rights;
   selecting, by a first registered user from the registered users, at least one second registered user from the registered users to have rights for accessing at least one registered site that is a personal site of the first registered user;
   checking, in response to a request for accessing the at least one personal site of the first registered user, wherein the request comes from an address of the at least one personal site being selected in an electronic message, whether said request comes from the second user, by using an indicator that provides authentication information to said site access control unit, wherein the indicator is a cookie; and
   refusing access to the at least one personal site if said request comes from a user that is not the second user and is either a registered user that does not have rights for accessing the at least one personal site or is not a registered user.

2. The access control method according to claim 1, wherein the information on the rights granted to a registered user includes the address of each registered site that can be accessed by said registered user.

3. The access control method according to claim 1 wherein the validity period indicates when and/or for what period of time the granted rights are valid.

4. A device for controlling access to web sites, comprising:
   hosting means for registering said sites and providing a hosting service;
   means for storing identification information identifying registered users of the hosting service and for storing information specific to each of said registered users, including rights for accessing one or more of the registered sites;
   means for performing an update of the registered users and of the information on the rights granted to said registered users, wherein the information on the granted rights includes data representing a validity period of the granted rights;
   means for selecting, by a first registered user from the registered users, at least one second registered user from the registered users to have rights for accessing at least one registered site that is a personal site of the first registered user;
   means for checking, in response to a request for accessing the at least one personal site, wherein the request comes from an address of the at least one personal site being selected in an electronic message, whether the request comes from the second user, by using an indicator that provides authentication information to said means for storing, wherein the indicator is a cookie; and
   means for refusing access to the at least one personal site if the request comes from a user that is not the second user and is either a registered user that does not have rights for accessing the at least one personal site or is not a registered user.

5. The access control device according to claim 4, wherein the hosting means is embodied by a first server implementing the hosting service.

6. The access control device according to claim 5, wherein the means for storing identification information is embodied by a second server implementing user database.

7. The access control device according to claim 6, wherein the means for checking the access requests is embodied by a third server.

8. The access control device according to claim 7, wherein the first, second, and third servers are separate servers at least logically linked together.

9. The access control device according to claim 4 wherein the validity period indicates when and/or for what period of time the granted rights are valid.

10. A server for hosting websites, comprising:
    means for linking to a server implementing a user database containing information identifying registered users of a hosting service and information for each of said registered users, including rights for accessing one or more hosted sites registered with the hosting service;
    means for performing an update of the registered users and of the information on the rights granted to said registered users, wherein the information on the granted rights includes data representing a validity period of the granted rights;
    means for selecting, by a first registered user from the registered users, at least one second registered user from the registered users to have rights for accessing at least one registered site that is a personal site of the first registered user; and
    means for linking to an administration server including a unit for managing site addresses and rights for accessing the registered sites for each registered user, said administration server being designed for:
      checking, in response to a request for accessing the at least one personal sites, wherein the request comes from an address of the at least one personal site being selected in an electronic message, whether the request comes from the second user, by using an indicator that provides authentication information to said administration server, wherein the indicator is a cookie; and
      refusing access to the at least one personal site if the request comes from a user that is not the second user and is either a registered user that does not have rights for accessing the at least one personal site or is not a registered user.

11. The server for hosting websites according to claim 10 wherein the validity period indicates when and/or for what period of time the granted rights are valid.

12. An administration server, comprising:
    means for linking to a website hosting server;
    a unit for managing addresses of sites registered with a hosting service and information regarding rights for accessing the addresses of the sites for users registered with the hosting service;
    means for performing an update of the registered users and of the information on the rights granted to said registered users, wherein the information on the granted rights includes data representing a validity period of the granted rights;

means for selecting, by a first registered user from the registered users, at least one second registered user from the registered users to have rights for accessing at least one registered site that is a personal site of the first registered user; and means for linking to a server where information identifying said registered users is stored, the server being a user database, containing information identifying said registered users of the hosting service and information for each of said registered users including rights for accessing one or more of the registered sites, said administration server being designed for:

checking, in response to a request for accessing the at least one personal site, wherein the request comes from an address of the at least one personal site being selected in an electronic message, whether the request comes from the second user by using an indicator that provides authentication information to said administration server, wherein the indicator is a cookie; and refusing access to the at least one personal site if the request comes from a user that is not the second user and is either a registered user that does not have rights for accessing the at least one personal site or is not a registered user.

13. The administration server according to claim 12 wherein the validity period indicates when and/or for what period of time the granted rights are valid.

14. A user database server, comprising:

means for storing information identifying users of a hosting service registered with the hosting service and information for each of said registered users including rights for accessing one or more hosted websites registered with the hosting service;

means for performing an update of the registered users and of the information on the rights granted to said registered users, wherein the information on the granted rights includes data representing a validity period of the granted rights;

means for linking to a hosting server providing said hosting service;

means for selecting, by a first registered user from the registered users, at least one second registered user from the registered users to have rights for accessing at least one registered hosted site that is a personal site of the first registered user; and means for linking to an administration server including a unit for managing addresses of the hosted websites and information regarding the rights for accessing the hosted websites for the registered users, the administration server being designed for:

checking, in response to a request for accessing the at least one personal site, wherein the request comes from an address of the at least one personal site being selected in an electronic message, whether the request comes from the second user by using an indicator that provides authentication information to said administration server, wherein the indicator is a cookie; and refusing access to the at least one personal site if the request comes from a user that is not the second user and is either a registered user that does not have rights for accessing the at least one personal site or is not a registered user.

15. The user database server according to claim 14 wherein the validity period indicates when and/or for what period of time the granted rights are valid.

* * * * *